United States Patent
Gardner

(10) Patent No.: US 7,045,083 B2
(45) Date of Patent: May 16, 2006

(54) CARBON LAYUP TAPE WITH FUGITIVE BINDER AND METHOD OF USE

(75) Inventor: Slade H. Gardner, Fort Worth, TX (US)

(73) Assignee: Lockheed Martin Corporation, Bethesda, MD (US)

(*) Notice: Subject to any disclaimer, the term of this patent is extended or adjusted under 35 U.S.C. 154(b) by 253 days.

(21) Appl. No.: 10/044,438

(22) Filed: Jan. 11, 2002

(65) Prior Publication Data
US 2003/0132543 A1    Jul. 17, 2003

(51) Int. Cl.
*B29C 70/48* (2006.01)

(52) U.S. Cl. ............... 264/102; 264/136; 264/257; 264/258; 264/324; 264/510; 264/511; 264/571

(58) Field of Classification Search ........ 264/510–512, 264/571, 257–258, 29.5, 29.6, 29.7, 102, 264/136, 324
See application file for complete search history.

(56) References Cited

U.S. PATENT DOCUMENTS

| | | | |
|---|---|---|---|
| H420 H * | 2/1988 | Yeager et al. ............... | 264/29.5 |
| 5,023,041 A * | 6/1991 | Jones et al. .................. | 264/510 |
| 5,439,627 A | 8/1995 | DeJager | |
| 5,942,182 A * | 8/1999 | Hoge et al. .................. | 264/510 |
| 6,299,810 B1 * | 10/2001 | Blackinton, Jr. ............ | 264/102 |
| 6,361,722 B1 * | 3/2002 | Theys et al. ................ | 264/29.2 |
| 6,537,470 B1 * | 3/2003 | Wood et al. ................ | 264/29.5 |

* cited by examiner

*Primary Examiner*—Stefan Staicovici
(74) *Attorney, Agent, or Firm*—Bracewell & Giuliani LLP

(57) ABSTRACT

A unidirectional tape comprising carbon fibers and a fugitive binder is provided, as well as methods for forming the tape and composite parts using the unidirectional tape in a resin-transfer molding (RTM) process. A fugitive binder adheres fibers of the tape. The tape is laid in an RTM mold, and the mold is sealed or vacuum bagged, then heated. Hot nitrogen gas is pumped through the mold cavity, heating the carbon fibers to completely pyrolyze the binder. No residue from the binder remains, as the nitrogen carries gaseous products from the pyrolysis out of the mold. The mold is cooled to a temperature suitable for resin injection, and resin is injected into the mold cavity, wetting the fibers of the tape and completely filling the cavities of the mold. The mold is heated to cause curing of the resin, then cooled and disassembled for removal of the completed composite component.

17 Claims, 4 Drawing Sheets

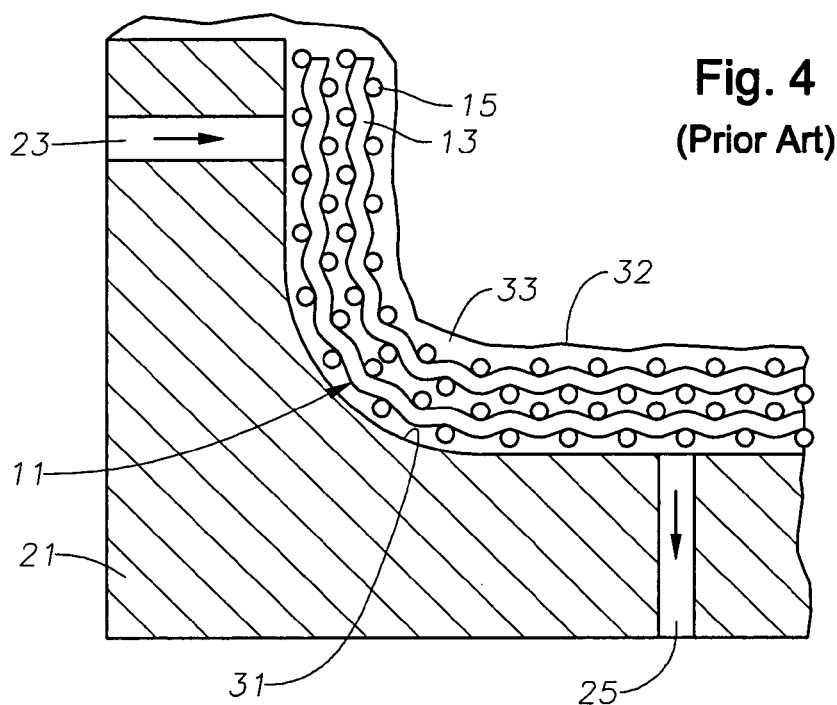
Fig. 4
(Prior Art)
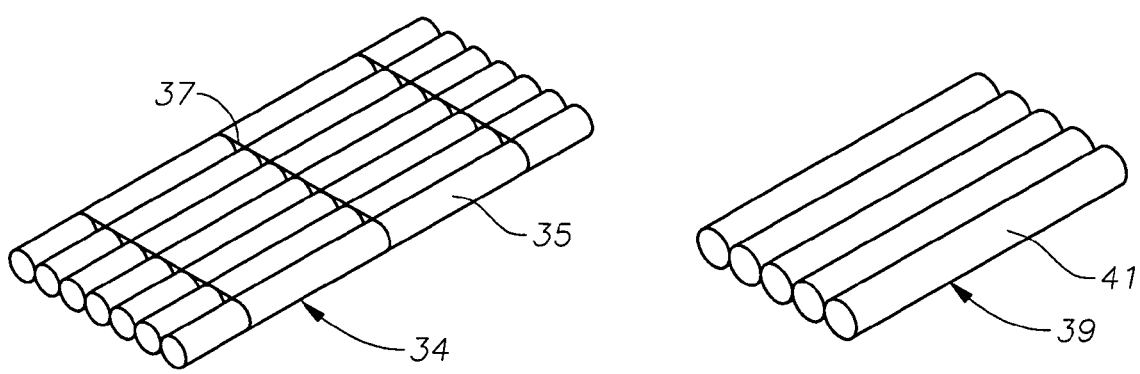
Fig. 5
(Prior Art)
Fig. 6

Fig. 7
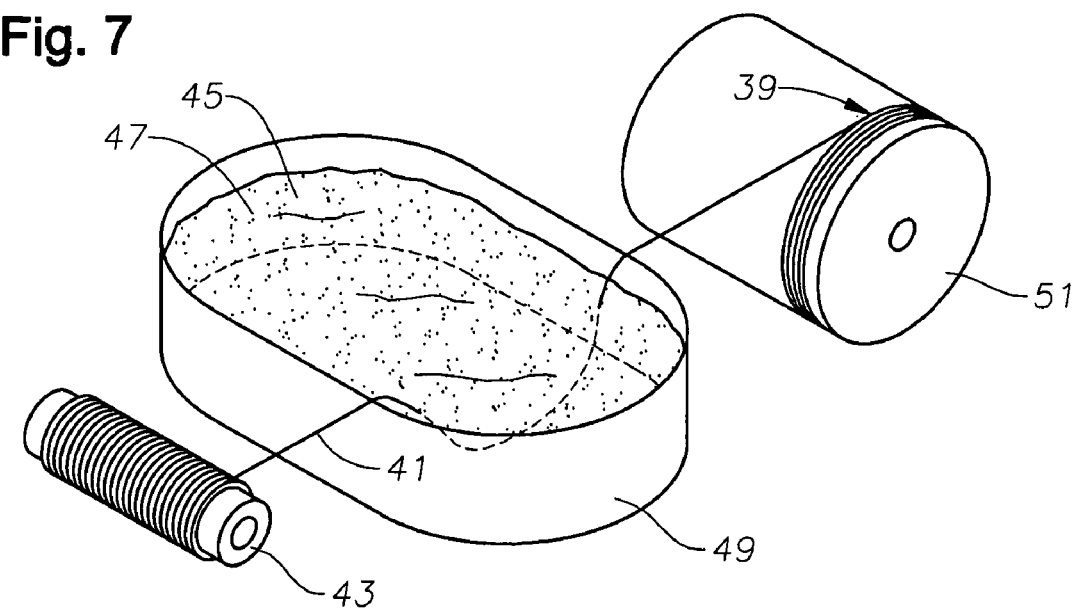
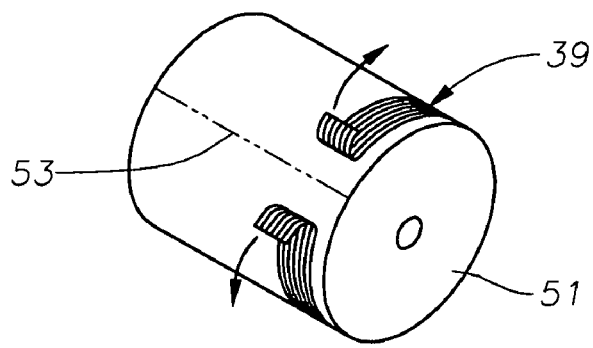
Fig. 8
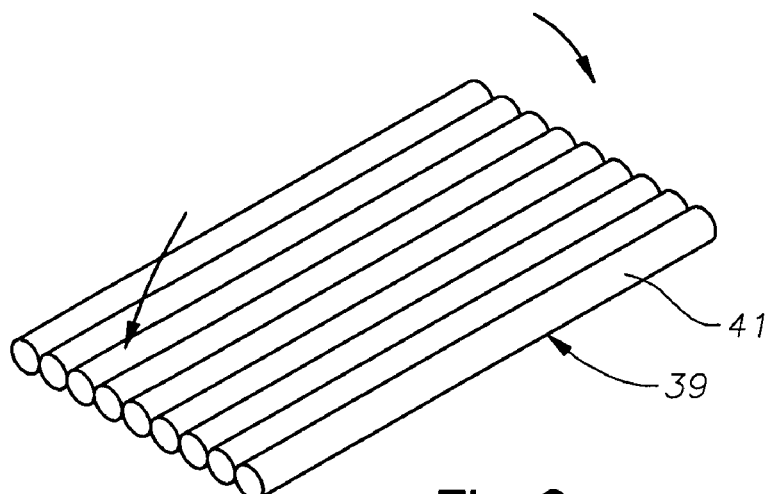
Fig. 9

CARBON LAYUP TAPE WITH FUGITIVE BINDER AND METHOD OF USE

BACKGROUND OF THE INVENTION

1. Field of the Invention

This invention relates generally to the forming composite components and relates specifically to forming composite components in a resin-transfer molding process.

2. Description of the Prior Art

Composite parts can be fabricated in a closed-mold process called resin-transfer molding (RTM), which is a commonly-used fabrication technique. Some RTM-produced parts are very simple in geometry, however recent developments have demonstrated RTM production of complex, unitized structures. Currently, commercially-available product forms such as woven and braided carbon fiber products are used in RTM production. As shown in FIG. 1, fabric 11 is typically woven from fibers 13, 15 oriented at a selected angle relative to each other, for example +/−45° or +/−90°. These products limit the design of many complex, load bearing, composite structures. The strength and stiffness of braided- and woven-fabric-based composites are inferior to unidirectional fiber designs. This is attributed to the fiber "waviness," caused by fibers weaving over and under fibers in the same plane and shown in FIG. 1, and also attributed to lower fiber volume fractions attainable with braided or woven products.

A typical RTM tool requires stacking many layers of carbon fabric inside a mold. Carbon fabric is used because it can be easily handled, cut to shape, and laid in place without disturbing the designed orientation of the individual carbon fibers. It is critical to orient the individual carbon fibers, hence the fabric, in the manner specified by the design engineer to ensure proper load capacities will be satisfied. Sometimes bundles of stitched fabric layers or braided preforms are used in RTM production, though these are expensive and difficult to manufacture.

As shown in FIGS. 1 through 3, RTM is typically done by placing fabric 11 into a tightly-sealed, matched, metal mold 13 and then injecting resin into mold 13. FIG. 2 shows a cross-section of a RTM mold 13, which comprises an upper portion 19 and a lower portion 21. Lower portion 21 has injection ports 23 and vent ports 25 extending through the thickness of lower portion 21. Ports 23, 25 lead to a cavity 27 located between mold surface 29 of upper portion 19 and mole surface 31 of lower portion 21.

As shown in FIG. 3, fabric 11 is laid on mold surface 31 of lower portion 21, and upper portion 19 is secured in position on lower portion 21, forming cavity 27 around fabric 11. Resin (not shown) is injected into cavity 27 through each injection port 23 while a vacuum is pulled on each vent port 25. The vacuum helps to pull the resin throughout fabric 11 and minimize dry spots formed by air pockets. After resin injection is complete, ports 23, 25 are closed, and mold 13 is heated to cure the resin. After cure, mold 13 is cooled and disassembled to release the composite part.

Two additional RTM methods for forming composites are reaction injection molding (RIM) and vacuum-assisted resin-transfer molding (VARTM). The RIM process uses the same type of mold as RTM, such as mold 13 in FIGS. 2 and 3, but a two-part resin is mixed immediately prior to injection, which may eliminate additional steps required for curing of the composite components.

The VARTM process, illustrated in FIG. 4, uses a one-sided negative or positive mold, here illustrated as the lower portion 21 of mold 13 (FIGS. 2 and 3), and a vacuum bag 32 enclosing mold cavity 33. Layers of fabric 11 are laid on mold 21 as described above, then vacuum bag 32 is placed over fabric 11 and mold 21. Air within cavity 33 is evacuated, and vacuum bag 32 compresses fabric 11 against surface 31 of mold 21. Springs, mesh, or other stiffeners may be used in certain regions to maintain resin flow paths. As in the RTM process, resin is then injected into cavity 33 through each injection port 23 while a vacuum is pulled on each vent port 25. Though ports 23 and 25 are shown in lower portion 21, injection and vent ports may also be located in vacuum bag 32.

It is useful to make comparisons to other, traditional manufacturing methods and materials. The simplest type of composite production techniques is hand layup. Parts that are laid by hand can be made of unidirectional tape, in which all fibers run parallel to each other. Use of unidirectional fabric in hand layup presents a benefit over typical RTM production because of the higher load-carrying capacity for a given composite laminate weight. The specific modulus and the specific strength of composites made from unidirectional tape are greater than for composites made from woven fabric prepreg. This translates into thinner, lower-weight components when unidirectional prepreg tape is used.

However, unidirectional prepreg tape cannot be used in an RTM production process without complications. Since prepreg tape already contains resin which is semi-cured, this resin will complicate the resin flow in the RTM mold. Also, complex unitized structures create a maze-like resin flow path. The probability of success in complete part wet-out for production of a high-quality part is increased by maximizing possible resin flow paths.

Dimensional stability is also difficult to control when a net shape, closed mold process is used. Prepreg tape is stiff at room temperature and presents problems when closing a matched metal mold. Higher fiber volume fractions are possible if the matched metal mold is closed with only carbon fiber inside, which can translate into higher component performance. However, fibers can move relative to each other and to the mold, leading to degradation of performance.

Some unidirectional "fabric" products exist. These materials are predominantly unidirectional carbon fiber stitched together at regular intervals with a fill direction yarn. FIG. 5 shows a portion of unidirectional fabric 34, with fibers 35 being held together by threads 37. Threads 37 are ignored for load-bearing considerations and are only intended to hold together the unidirectional, wrap direction fibers. These products are difficult to handle and present complications with maintaining alignment of the fibers, especially over complex contoured surfaces. Once a ply of fabric 34 is laid down, it can be disturbed by layup of a subsequent ply. Unidirectional fabrics are difficult to cut to net shape and the cut edges often become ragged.

Thus, there is a need for a method of producing composite components in an RTM process using unidirectional fibers that avoids the resin flow path problems caused by using unidirectional prepreg tape and provides for maintaining alignment of fibers during layup.

SUMMARY OF THE INVENTION

A unidirectional tape comprising carbon fibers and a fugitive binder is provided, as well as methods for forming the tape and composite parts using the unidirectional tape in a resin-transfer molding (RTM) process. A fugitive binder is applied to carbon fibers used to form a tape, the binder adhering the individual fibers of the tape to one another. The tape is then laid in an RTM mold, and the mold is sealed or vacuum bagged. The mold is heated, and hot nitrogen gas is pumped through the mold cavity or bag, heating the carbon fibers. The fugitive binder is completely pyrolyzed and leaves no residue, as the nitrogen carries gaseous products from the pyrolysis of the binder to outside the mold. The mold is cooled to a temperature suitable for resin injection, and resin is then injected into the mold cavity, wetting the fibers of the tape and completely filling the cavities of the mold. The mold is heated to cause curing of the resin, then cooled and disassembled for removal of the completed composite component.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

FIG. 4 is an enlarged, cross-sectional view of the lower portion of the mold of FIG. 2 during a prior-art VARTM process.

FIG. 5 is a perspective view of a prior-art unidirectional prepreg tape.

FIG. 6 is a perspective view of a unidirectional tape formed in accordance with the present invention.

FIG. 7 is a perspective view of the method of forming unidirectional tape in accordance with the present invention.

FIG. 8 is a perspective view of a subsequent step in the method of forming unidirectional tape in accordance with the present invention.

FIG. 9 is a perspective view of a subsequent step in the method of forming unidirectional tape in accordance with the present invention.

DETAILED DESCRIPTION OF THE INVENTION

Figure 1:
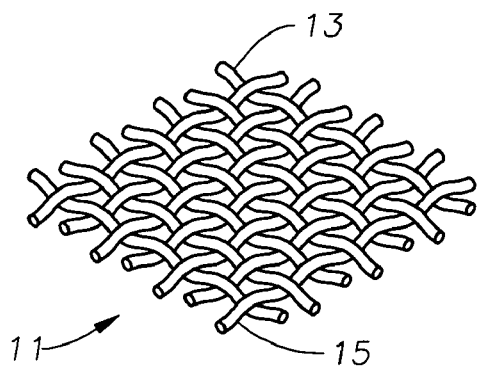
FIG. 1 is a schematic, perspective view of a prior-art woven fabric.
Figure 2:
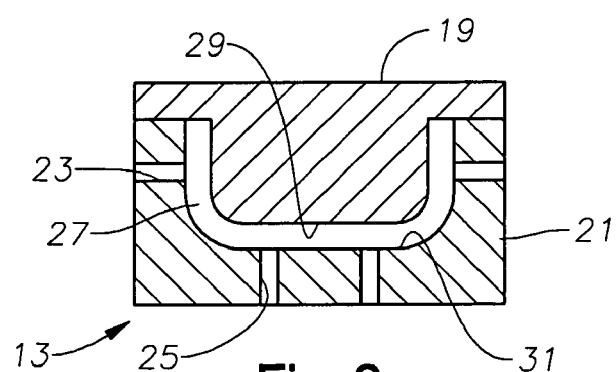
FIG. 2 is a cross-sectional profile view of a prior-art RTM mold.
Figure 3:
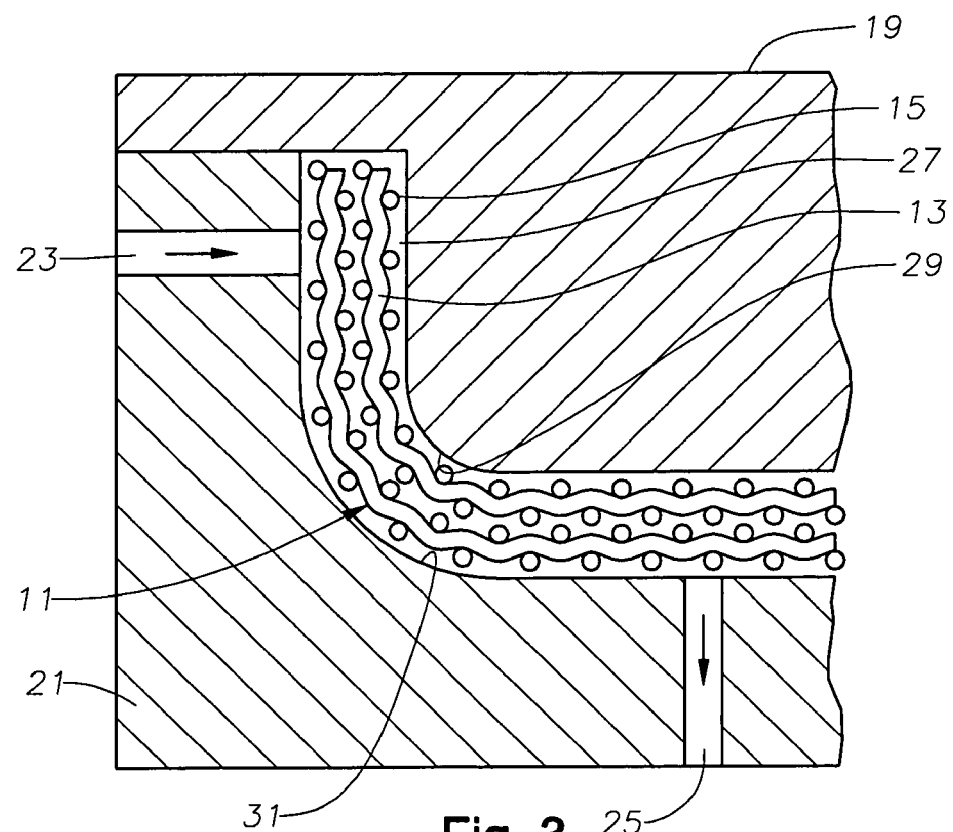
FIG. 3 is an enlarged, cross-sectional view of the mold of FIG. 2 during a prior-art RTM process.

Referring to FIG. 6, unidirectional carbon tape 39 comprises parallel carbon or aramid fibers 41 and a fugitive binder that holds fibers 41 together. Fibers 41 may also be formed from glass, ceramic oxide, alumina, aluminosilica, alumina zirconia yttria, aluminoborosilicate, silicon carbide, or similar materials. All of fibers 41 are parallel to each other. Prior-art unidirectional carbon tape, as shown in FIG. 5, is typically made with approximately 40% resin by volume, whereas the amount of fugitive binder required in tape 39 is preferably less than 40% and possibly as low as 15%. The fugitive binder is preferably an aliphatic, thermoplastic, organic polymer which pyrolyzes completely when heated in an inert atmosphere. Ideal binders are water soluble, and suitable polymers for this application include hydroxypropyl cellulose, hydroxyethyl cellulose, hydroxymethyl cellulose, polyvinyl alcohol, polyvinyl pyrrolidone and polyvinyl acetate. For many of the example polymers, pyrolysis can be achieved with a thermal treatment of 650° F. for thirty minutes. After this pyrolysis, the fugitive binder is completely "burned off," leaving no charred material or residue.

The fugitive binder can be applied to fibers 41 of tape 39 in various ways. The preferred, low-volume method is illustrated in FIGS. 7 through 9. FIG. 7 shows a single fiber 41 feeding from a supply roll 43 and through an aqueous solution 45 of binder 47, solution 45 being contained within tub 49. Fiber 41 is then wound onto a rotating takeup drum 51, turns of fiber 41 being continuously laid adjacent the previously-laid turns on takeup drum 51 and forming tape 39. The required number of revolutions of takeup drum 51 is based on the desired width of tape 39, with more revolutions and turns of fiber 41 creating a wider tape 39. After a sufficient number of turns of fiber 41 have been wound onto takeup drum 51, tape 39 is cut from drum 51 along line 53, as shown in FIG. 8, and the free ends of tape 39 are pulled away from drum 51. Tape 39 can then be laid flat, as in FIG. 9, and placed in an oven for drying the water from tape 39.

Though not shown, for large-scale production of tape 39, industrial prepreg equipment may be used to impregnate many tows of fiber at once, for example, 36 to 240 rows. The fibers can then be used to form unidirectional tape having widths of approximately 6 to 60 inches. Each tow would feed from an individual spool of fiber, the tows being aligned in a web with controlled tension and coated with fugitive binder resin in the same manner as described above, the tape then being drid in an oven. An alternative method of applying binder is to use a standard melt film application, wherein the tape is compacted between film release paper. After application of resin using either method, the tape is rolled onto a drum or prepared for other storage methods until needed for use.

Tape 39 is a semi-stiff tape which maintains the carbon fiber orientation in a solid sheet of material. Tape 39 has a smooth surface and provides for easy handling during cutting operations and layup. Since the polymeric binder is water soluble, tape 39 can be made very flexible by applying a light spray of water. A spray of water will also provide tackiness that can be used to maintain the orientation of adjacent plies of tape 39, providing excellent layup qualities.

Figure 10:
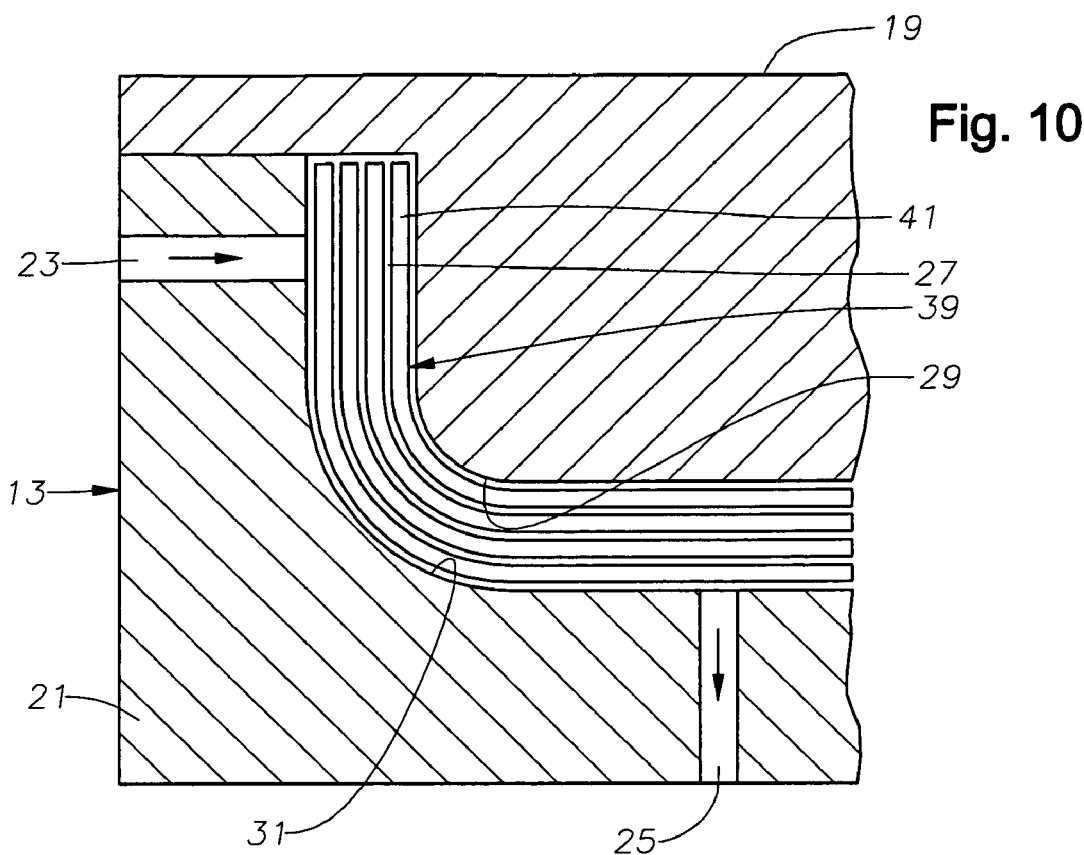
FIG. 10 is an enlarged, cross-sectional view of the unidirectional tape of FIG. 9 during a RTM process of the present invention.

The RTM process using tape 39 is begun with the layup of the carbon fiber material in the mold. FIG. 10 shows four layers of tape 39 laid on surface 31 of the lower portion 21 of mold 13, though the layup can be a combination of woven fabrics, stitched fabrics, braided preforms, and tape 39. Though layers of tape 39 are shown to be laid in the same direction in FIG. 10, the layers of tape 39 may be laid at angles relative to each other, for example, +/−45° or +/−90°. After the layup is completed, mold 13 is closed by placing upper section 19 onto lower section 21, sealing the laid-up layers within cavity 27.

The next step is to pyrolyze the binder of tape 39. Mold 13 preferably has several injection ports 23 and several vent ports 25. Pyrolysis is preferably accomplished by heating mold 13 to a suitable processing temperature and injecting hot nitrogen gas into cavity 27 of mold 13 through injection ports 23. It is not required that mold 13 be heated to the "burn off" temperature (such as 650° F.), but mold 13 could be heated to a lower temperature, such as 400° F. to 450° F., which reduces the heat loss through the walls of mold 13 and allows the hot nitrogen to heat tape 39 more effectively. The nitrogen gas injected into mold 13 is at a temperature of 650° F. to 1300° F., and a suitable time is allowed to fully pyrolyze the fugitive binder. Vent ports 25 are connected to an exhaust, and during most of the pyrolysis step, vent ports 25 can be at atmospheric pressure. At the end of the pyrolysis, vacuum is drawn on vent ports 25 and the injection of the nitrogen gas is stopped. Injection ports 23 are closed and a full vacuum is pulled on mold 13 to evacuate cavity 27. Carbon fibers 41 of tape 39 will cool very quickly. As the binder is pyrolyzed, fibers 41 are held in place by the mechanical pressure caused by fibers 41 being slightly compressed between surfaces 29, 31.

Injection ports 23 are then switched to accept resin. Mold 13 will already be preheated and the temperature should be lowered to a processing temperature suitable for RTM injection. The RTM procedures then continue as described above for conventional methods, resin being injected into cavity 27 through each injection port 23 while a vacuum is pulled on each vent port 25. After closing ports 23, 25, mold 13 is heated to cure the resin, then mold 13 is cooled and disassembled to release the composite part. The RIM method follows the same steps as the RTM method, but a two-part resin in mixed immediately prior to injection into mold 13.

Figure 11:
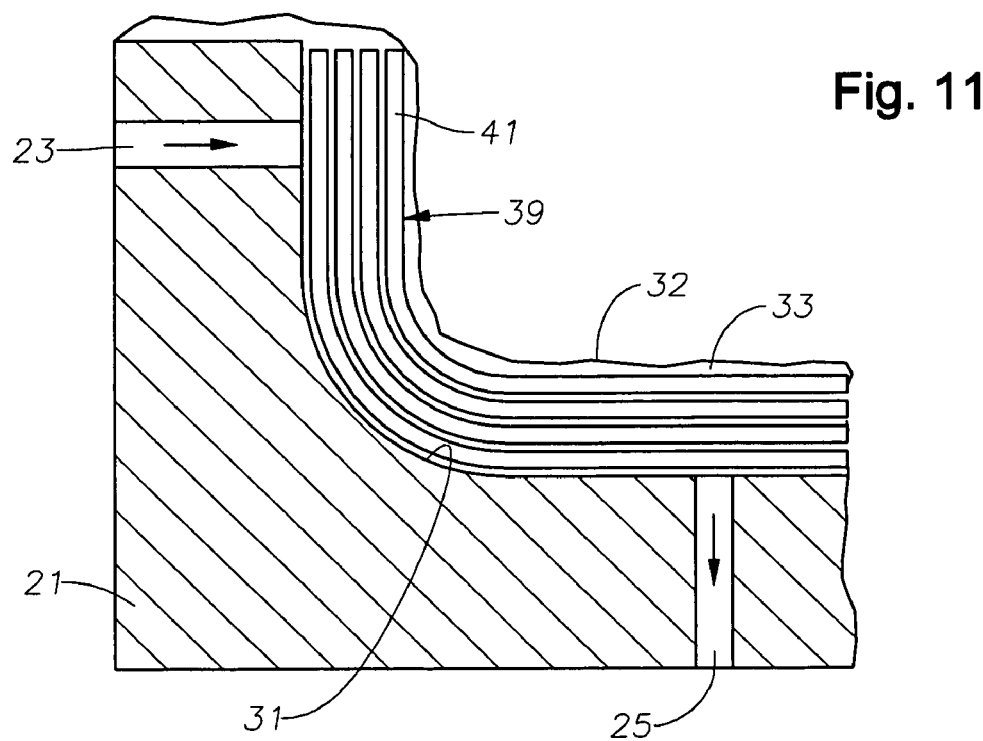
FIG. 11 is an enlarged, cross-sectional view of the unidirectional tape of FIG. 9 during a VARTM process of the present invention.

FIG. 11 shows the VARTM method using tape 39. Layers of tape 39 are laid in the lower portion of mold 13, then vacuum bag 32 is placed over tape 39 and lower portion 21 to form mold cavity 33. Vacuum bag 32 is formed of a material capable of withstanding the high-temperatures needed for complete pyrolyzation of the fugitive binder, for example, a high-temperature polyamide film. Air is evacuated from cavity 33, and bag 32 compacts the layers of tape 39 onto surface 31 of lower portion 21. Hot nitrogen gas is injected through injection ports 23 for pyrolyzing the fugitive binder, as described for the RTM method, the gas exiting then through vent ports 25. Once the binder is pyrolyzed, lower portion 21 is cooled, then a vacuum is pulled within cavity 33, and resin is injected through port 23 to fill cavity 33 and wet tape 39. The resin is cured, and bag 32 is removed prior to removal of the component.

There are several advantages to using the present invention for RTM processes. The new method enables a new RTM manufacturing process that implements unidirectional carbon-fiber material in the structure. This present invention maximizes the specific strength and specific stiffness of carbon fiber for complex, unitized structures. The use of unidirectional tape will allow for stronger and lighter composite parts to be formed using RTM. Also, combinations of woven, preform, and unidirectional materials will enable breakthrough designs of unitized structures, which maximize the load bearing potential of carbon fiber composites while improving manufacturability and costs. This method eliminates the possibility of resin incompatibility or contamination in military applications. A further benefit is that water soluble materials are desirable for simple and environmentally-friendly manufacture. Since all of the polymers identified above are also inexpensive, the result is a reasonably low cost product.

While the invention has been shown in only some of its forms, it should be apparent to those skilled in the art that it is not so limited but is susceptible to various changes without departing from the scope of the invention.

I claim:

1. A method for forming composite components, the method comprising:
    (a) providing a mold having a mold cavity, at least a portion of the mold cavity having a selected shape for forming a composite component;
    (b) providing sections of adjacent fibers, the fibers being parallel to each other and being coated with a fugitive binder that adheres the fibers to each other;
    (c) arranging the fibers within the mold cavity and assembling the mold; then
    (d) heating the fibers to a temperature sufficient to pyrolyze the binder leaving no charred material or residue in the mold other than the fibers; then
    (e) injecting resin into the mold cavity, the resin forming a matrix enclosing the fibers; then
    (f) curing the resin; and then
    (g) removing the composite component from the mold cavity; wherein:
    step (a) comprises providing a mold that has at least one injection port and at least one vent port, the ports communicating an exterior of the mold and the mold cavity; and
    step (d) further comprises flowing a heated gas into the mold cavity through the injection port and out of the mold cavity through the vent port, the heated gas pyrolyzing the fugitive binder.

2. The method of claim 1, wherein: a portion of the mold cavity is formed from a vacuum bag.

3. The method of claim 1, wherein: the gas is nitrogen.

4. The method of claim 1, wherein: the fugitive binder is an aliphatic, thermoplastic, organic polymer.

5. The method of claim 1, wherein: the fugitive binder is water soluble.

6. The method of claim 1, wherein: the fugitive binder is selected from the group consisting of hydroxypropyl cellulose, hydroxyethyl cellulose, hydroxymethyl cellulose, polyvinyl alcohol, polyvinyl pyrrolidone and polyvinyl acetate.

7. The method of claim 1, wherein: the fibers are formed from a plurality of carbon fibers.

8. The method of claim 1, wherein: the fibers are formed from a material selected from the group consisting of glass, ceramic oxide, alumina, aluminosilica, alumina zirconia yttria, aluminoborosilicate, and silicon carbide.

9. A method for forming composite components, the method comprising:
    (a) providing mold having a mold cavity, at least a portion of the mold cavity having a selected shape for forming a composite component, the mold also having at least one injection port and at least one vent port, the ports communicating an exterior of the mold and the mold cavity;
    (b) providing sections of unidirectional fibers that are coated with a fugitive binder that adheres the fibers to each other;
    (c) arranging the fibers within the mold cavity and assembling the mold; then flowing a gas into the mold cavity through the injection port and out of the mold cavity through the vent port while heating the fibers to a temperature sufficient to pyrolyze the binder leaving no charred material or residue in the mold other than the fibers; then
    (d) injecting resin into the mold cavity through the injection port, the resin forming a matrix enclosing the fibers; then
    (e) heating the mold to cure the resin; and then
    (f) removing the composite component from the mold cavity; and wherein:
    step (d) further comprises heating the gas flowing through the mold cavity prior to flowing the gas through the mold cavity.

10. The method of claim 9, wherein: a portion of the mold cavity is formed from a vacuum bag.

11. The method of claim 9, wherein: the gas is nitrogen.

12. The method of claim 9, wherein: the fugitive binder is an aliphatic, thermoplastic, organic polymer.

13. The method of claim 9, wherein: the fugitive binder is water soluble.

14. The method of claim 9, wherein: the fugitive binder is selected from the group consisting of hydroxypropyl cellulose, hydroxyethyl cellulose, hydroxymethyl cellulose, polyvinyl alcohol, polyvinyl pyrrolidone and polyvinyl acetate.

15. The method of claim 9, wherein: the fibers are formed from a plurality of carbon fibers.

16. The method of claim 9, wherein: the fibers are formed from a material selected from the group consisting of ceramic oxide, alumina, aluminosilica, alumina zirconia yttria, aluminoborosilicate, and silicon carbide.

17. The method of claim 9, further comprising: after step (d) and before step (e), drawing a vacuum on the mold cavity.

* * * * *